United States Patent
Joshipura et al.

(10) Patent No.: US 12,406,078 B2
(45) Date of Patent: *Sep. 2, 2025

(54) CALL LOCATION BASED ACCESS CONTROL OF QUERY TO DATABASE

(71) Applicant: SONICWALL INC., Milpitas, CA (US)

(72) Inventors: Bhushit Joshipura, Bangalore (IN); Soumyadipta Das, Bangalore (IN); Arun Yogeesh, Milpitas, CA (US); Navaneeth Ashok, Bangalore (IN)

(73) Assignee: SONICWALL INC., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,135

(22) Filed: Jun. 6, 2023

(65) Prior Publication Data

US 2023/0315890 A1  Oct. 5, 2023

Related U.S. Application Data

(63) Continuation of application No. 16/779,262, filed on Jan. 31, 2020, now Pat. No. 11,675,920.

(Continued)

(51) Int. Cl.
*G06F 21/62* (2013.01)
*G06F 16/14* (2019.01)
(Continued)

(52) U.S. Cl.
CPC ........ *G06F 21/6218* (2013.01); *G06F 16/144* (2019.01); *G06F 21/31* (2013.01); *G06F 21/44* (2013.01); *G06F 2221/2113* (2013.01)

(58) Field of Classification Search
CPC ....... G06F 21/6227; G06F 21/31; G06F 21/44
See application file for complete search history.

(56) References Cited

U.S. PATENT DOCUMENTS 6,820,082 B1  11/2004  Cook et al.
7,185,357 B1 * 2/2007  Wong ................. G06F 21/6227
                                                    726/1

(Continued)

OTHER PUBLICATIONS

M. Davari and E. Bertino, "Access Control Model Extensions to Support Data Privacy Protection based on GDPR," 2019 IEEE International Conference on Big Data (Big Data), Los Angeles, CA, USA, 2019, pp. 4017-4024 (Year: 2019).*

(Continued)

*Primary Examiner* — Kari L Schmidt
(74) *Attorney, Agent, or Firm* — Polsinelli LLP

(57) ABSTRACT

The present disclosure is directed to protecting data stored at a database in a manner that increases data protection minimizing performance reductions. Apparatus and methods consistent with the present disclosure may collect information from user devices from which user inputs are received when collecting data that may be used to protect database data. Methods consistent with the present disclosure may identify code paths traversed, pages of program code where actions were initiated, and functions associated with those actions. This information may be cross-referenced with a set of data, constraints, rules, or command parameters when data associated with a database query is initially associated with an "allow" action or a "deny" action. This information may also be used to evaluate whether newly generated database queries should be allowed to be sent to a database server or to identify whether a database request should be blocked.

17 Claims, 6 Drawing Sheets

Related U.S. Application Data

(60) Provisional application No. 62/943,132, filed on Dec. 3, 2019.

(51) Int. Cl.
*G06F 21/31* (2013.01)
*G06F 21/44* (2013.01)

(56) References Cited

U.S. PATENT DOCUMENTS

| | | | |
|---|---|---|---|
| 7,558,796 | B1 | 7/2009 | Bromwich et al. |
| 7,962,513 | B1 | 6/2011 | Boles et al. |
| 8,572,037 | B2 | 10/2013 | Kreuder et al. |
| 10,212,257 | B2 | 2/2019 | Teodorescu et al. |
| 10,726,056 | B2* | 7/2020 | Liu .................. G06F 16/3344 |
| 11,030,335 | B2 | 6/2021 | Rodniansky |
| 11,500,824 | B1* | 11/2022 | Tighe ................ G06F 16/2452 |
| 11,675,920 | B2 | 6/2023 | Joshipura et al. |
| 2002/0161766 | A1 | 10/2002 | Lawson et al. |
| 2004/0044655 | A1 | 3/2004 | Cotner et al. |
| 2004/0225647 | A1* | 11/2004 | Connelly .......... G06F 16/9532 |
| 2005/0177570 | A1 | 8/2005 | Dutta et al. |
| 2005/0278276 | A1 | 12/2005 | Andreev et al. |
| 2005/0289463 | A1* | 12/2005 | Wu ...................... G06F 40/232 704/9 |
| 2007/0156666 | A1 | 7/2007 | VanRiper et al. |
| 2007/0214497 | A1 | 9/2007 | Montgomery et al. |
| 2008/0222134 | A1* | 9/2008 | Krishnamurthy ..... G06F 16/951 707/999.005 |
| 2008/0281809 | A1* | 11/2008 | Anderson .......... G06Q 30/0256 707/999.005 |
| 2009/0013194 | A1 | 1/2009 | Mir et al. |
| 2009/0100004 | A1* | 4/2009 | Andrei ............... G06F 16/2453 |
| 2009/0198679 | A1* | 8/2009 | Lu .......................... G06F 16/334 707/999.005 |
| 2010/0036846 | A1 | 2/2010 | Rafiq et al. |
| 2010/0332473 | A1* | 12/2010 | Brodsky ............. G06F 11/3636 707/736 |
| 2012/0063593 | A1 | 3/2012 | Camenisch et al. |
| 2012/0191748 | A1 | 7/2012 | Gross |
| 2014/0244684 | A1 | 8/2014 | Krishnamurthy |
| 2014/0280332 | A1 | 9/2014 | Porterfield |
| 2015/0310067 | A1* | 10/2015 | Svoboda ............. G06F 21/6218 707/781 |
| 2015/0317317 | A1* | 11/2015 | Deng ................. G06F 16/24578 707/748 |
| 2016/0088676 | A1 | 3/2016 | Zhao et al. |
| 2017/0063975 | A1 | 3/2017 | Prakash et al. |
| 2017/0118221 | A1* | 4/2017 | Hannel ............... H04L 63/0471 |
| 2018/0165366 | A1 | 6/2018 | Kumar |
| 2018/0293399 | A1 | 10/2018 | Chan |
| 2019/0042623 | A1* | 2/2019 | Marcel ............. G06F 16/24549 |
| 2019/0058768 | A1 | 2/2019 | Feijoo et al. |
| 2019/0081958 | A1* | 3/2019 | Lee ..................... H04L 63/0209 |
| 2019/0147108 | A1* | 5/2019 | Liu ........................ G06N 5/041 707/706 |
| 2019/0205242 | A1* | 7/2019 | Weis .................. G06F 11/3006 |
| 2019/0220607 | A1* | 7/2019 | Dodor ..................... G06F 16/27 |
| 2019/0377891 | A1* | 12/2019 | Krieger ............. G06F 21/6227 |
| 2020/0042647 | A1* | 2/2020 | Pandey ................ G06N 20/00 |
| 2020/0272750 | A1 | 8/2020 | Hoeffer et al. |
| 2021/0026898 | A1* | 1/2021 | Khillar ............. G06F 16/90332 |
| 2021/0165899 | A1 | 6/2021 | Joshipura et al. |
| 2024/0086566 | A1* | 3/2024 | Lim .................... G06F 21/6227 |

OTHER PUBLICATIONS

Shay, Richard, et al. "Don't even ask: Database access control throught query control." ACM SIGMOD Record 47.3 (2019): 17-22. (Year: 2019).*
U.S. Appl. No. 16/779,262 Office Action mailed Jul. 14, 2022.
U.S. Appl. No. 16/779,262 Final Office Action mailed Apr. 5, 2022.
U.S. Appl. No. 16/779,262 Office Action mailed Oct. 27, 2021.
U.S. Appl. No. 16/779,262 Notice of Allowance mailed Feb. 1, 2023.
Skrupsky et al., TamperProof: a server-agnostic defense for parameter tampering attacks on web applications. In Proceedings of the third ACM conference on Data and application security and privacy (CODASPY '13), pp. 129-140. (Year: 2013).
Puttaswamy et al., "Silverline: toward data confidentiality in storage-intensive cloud applications." Proceedings of the 2nd ACM Symposium on Cloud Computing. 2011, pp. 1-13. (Year: 2011).
Cabaj et al., "Using software-defined networking for ransomware mitigation: the case of cryptowall." IEEE Network 30.6 (2016): 14-20. (Year: 2016).
Zhuang et al. "ERi: A New Method for Ensuring Request Integrity." Proceedings of the 9th EAi International Conference on Mobile Multimedia Communications. 2016, pp. 126-129. (Year: 2016).

* cited by examiner

CALL LOCATION BASED ACCESS CONTROL OF QUERY TO DATABASE

CROSS REFERENCE TO RELATED APPLICATIONS

The present application is a continuation and claims the priority benefit of U.S. patent application Ser. No. 16/779,262 filed Jan. 31, 2020, now U.S. Pat. No. 11,675,920, which claims the priority benefit of U.S. provisional application 62/943,132 filed Dec. 3, 2019, the disclosures of which are incorporated herein by reference.

BACKGROUND OF THE INVENTION

Field of Invention

The present disclosure generally relates to protecting computer data. More specifically, the present disclosure relates to preventing data stored at a database server from being provided to unauthorized individuals or computers.

Description of the Related Art

In prevailing web-application architectures, protection-worthy data is generally stored at a database server. This data is accessed through a web server or web application program (APP). The purpose of a database server is to provide data to users that have a need or a right to access data stored at a database server. For example, a person that has a bank account with Chase Bank may access information associated with their bank account over the internet. In such an instance, this person may login into a web server operated by Chase Bank by entering a username and a password into a login page displayed in a web browser of a computer owned by the person. The web server will then check the username and password when that the username and password match login information stored at the web server. After logging in, the person is then able to access data stored at a database by making selections in a web page displayed by their web browser on a display. Selections made by the person then cause the web browser to send data input by a user to the web server that are in turn used to generate a database request that is sent to a database server for processing. The database server may then service the request and send the requested data back to the web browser of the person's computer via the web server. The user login process is a rudimentary method used by web servers to protect user data. Another rudimentary method that may be employed by a web server or web application program is to validate that inputs received from a web browser are consistent with typical user requests. For example, a web browser may compare information included in a request query with queries that are known to be legitimate and if the request appears to be consistent with the known legitimate requests, the query may be forwarded to a database server.

In certain instances, a database server may evaluate a data request when attempting to protect data from being accessed by unauthorized individuals or by computer malware. In other instances data requests/queries may be evaluated by a computer or "proxy" that is located between a web server and a database server. Methods used by database servers or proxies to protect user data may include evaluating whether a request is limited to accessing data in a manner that appears to be legitimate. For example, a database server may evaluate a request query to see if that query is limited to accessing data associated with a single logged in user and if that query is not limited to data associated with that single logged in user, the data request may be judged to be illegitimate. As such, a request query attempting to access a list of all authorized users of a website may be judged to be illegitimate. In reasonably complex database schemas, protection against illegitimate access is generally implemented at a database server or at a proxy computer.

When a proxy computer is used, that proxy computer is located between a web server or web application program and a database server. Database requests that otherwise could be sent to a database server are forwarded through the proxy computer. Proxy computers may also perform other actions when attempting to protect user data. For example, a proxy computer may receive a request query and allow operations to be performed at the proxy computer when the proxy enforces a set of basic rules when judging whether the data request query appears legitimate. Proxy-based solutions suffer from disadvantages of increased latency and slow operation. Since data base servers or proxy computers do not have access to data that identifies how or where a particular database request was generated, database servers and proxy computers cannot identify threatening access requests from non-threatening access requests. The use of a proxy also involves two operations—a first operation that requires an app server to send a request to the proxy and a second operation where the request is sent from proxy to the actual database after the proxy performs a limited set of evaluations. The first call provides security, yet invariably involves interpretation of the query. The forwarding and interpretation of queries by a proxy computer results in the reduced performance and slow operation of overall data access.

The various different approaches to protecting data stored at a database are limited because each of these methods evaluates request queries from a single perspective. Web servers are limited to reviewing query requests based on information stored at the web server and database servers or proxy computers are limited to evaluating query requests based on data stored at the database server or at the proxy computer. Furthermore proxy computers, and database servers have no way of identifying where or how a request was generated. In contrast, web servers and web application programs do generate access requests from particular locations and these web servers or applications can identify a purpose associated with access requests. Current web servers and web application programs are not configured to identify locations where requests originated and are not configured to identify that an access request was generated for a purpose. As such, current proxy computers, database servers, web servers, and web application programs cannot be configured to make decisions based on such information. As such, data stored at database servers is at risk when query requests appear to be legitimate as judged by one or more rudimentary methods. Since current methods for protecting database data fall short of optimal, what are needed are new methods and apparatus that protect database data. What are also needed are new methods and apparatus that identify where and how a request was generated such that database data can be protected.

SUMMARY OF THE CLAIMED INVENTION

The presently claimed invention relates to a method, a non-transitory computer readable storage medium, and an apparatus that may execute functions consistent with the present disclosure. A method consistent with the present disclosure may receive user input from a computing device and allow a database request to be generated based on the user input while collecting information when the database request was generated. The presently claimed method may also compare the collected information and a parameter included in the database request with reference information and a constraint when identifying an action that can be a deny action. The database request may be prevented from being sent to a database server when the collected information matches the reference information, the constraint matches the database parameter, and the action is the deny action.

When the presently claimed method is implemented as a non-transitory computer readable storage medium, a processor executing instructions out of a memory may perform steps consistent with the present invention. Here again a method consistent with the present disclosure may receive user input from a computing device and allow a database request to be generated based on the user input while collecting information where and possibly when the database request was generated. The method may also compare the collected information and a parameter included in the database request with reference information and a constraint when identifying an action that can be a deny action. The database request may be prevented from being sent to a database server when the collected information matches the reference information, the constraint matches the database parameter, and the action is the deny action.

An apparatus consistent with the present disclosure may include a memory and a processor that executes instructions out of the memory to prepare to generate a database request from received user input, allow the database request to be generated, and to collect information associated with the generation of the database request. The generated database request may include a parameter. The processor then may compare the collected information and the database parameter with reference information and a constraint when identifying an action that can be a deny action. The database request may be prevented from being sent to a database server when the collected information matches the reference information, the constraint matches the database parameter, and the action is the deny action.

DETAILED DESCRIPTION

Figure 1:
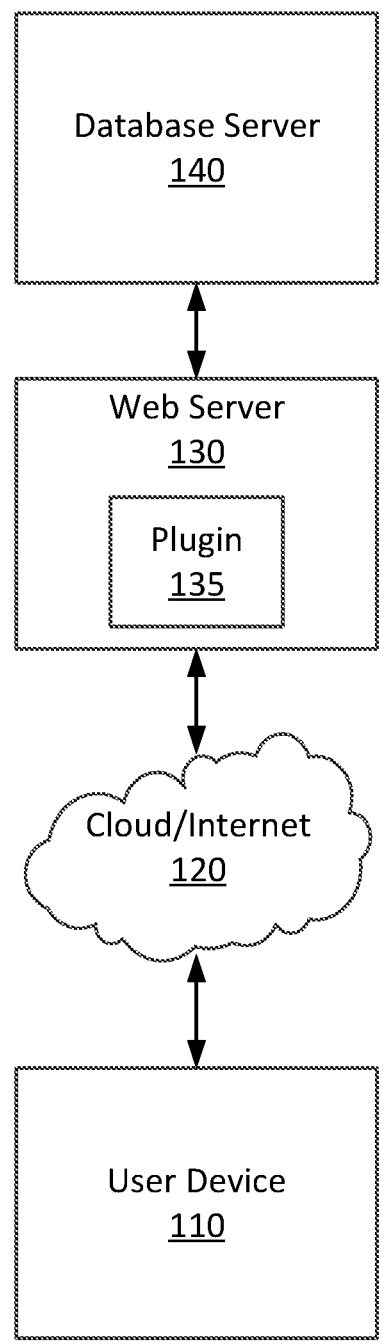
FIG. 1 illustrates elements of a wireless mesh network that communicates with a cloud management system.

The present disclosure is directed to protecting data stored at a database in a manner that increases data protection in a manner that minimizes performance reductions. Legacy web server or web application program implementations do not identify, use, or pass any information to a database server that identifies a location in a set of program code where a database request query was generated. Furthermore, conventional database servers are not designed to expect a web server or web application program to pass code location data to the database server.

To better protect database data, methods consistent with the present disclosure may collect information from user devices from which user inputs are received. This user device information may be combined with information collected at a web server or web application program when a database request is generated and evaluated to see whether that request should be blocked or not. A processor executing instructions out of a memory at a web server may identify code paths traversed, pages of program code where actions were initiated, functions associated with those actions, and potentially other factors when protecting data stored at a database. These instructions may also allow the processor to collect information for later use when learning code pathways, identifying program code pages were actions were initiated, and when identifying functions associated with actions performed when a database request was generated. This information may be cross-referenced with a set of data, constraints, rules, or parameters that may be specified by a user using a specified or preferred method. Such data sets, constraints, rules, or parameters can be initially associated with an "allow" action or a "deny" action.

A table of data that includes such data, constraints, rules, or parameters may be referred to as an access control list (ACL). This ACL may be stored in memory and data in this table may cross-reference code location data, page location data and function data of the origin of the query, with filtering information that may be used to identify that a request is an allowable request or when identifying that the request should be blocked (denied). This table of data may store information that triangulates several different types of data from different perspectives. For example user device data, browser data, or user input information can be cross-referenced with a perspective of a user device, data collected when a database request is generated from received user input can be cross-referenced with the perspective of a web server, and constraints that limit the scope of access requests can be based on limitations imposed from the perspective of a database server or the owners of the database server.

Methods and apparatus consistent with the present disclosure may collect information from different apparatus and use that information to identify whether a request is legitimate. For example, a web server could collect an internet protocol (IP) address, information that identifies a type or revision of a set of browser software, or information that identifies a time zone or location from a computer that sent information that results in the generation of a database request. User inputs or browser data received from certain time zones or locations could be judged suspicious and be blocked. IP address information could be used to identify whether a particular computer has previously accessed data via the web server. Next, the web server, application program, or other software at the web browser could collect information that identifies a location in a set of program code that processed user inputs included in data received from a browser. This information could be used to identify whether the program code location actually is a location where user inputs are typically processed. The database query is deemed illegitimate if it originated due to an unexpected the user inputs and/or if it originated from location where code that is being tested resides. Such a finding may be identified when received user or user inputs are processed at a program code location that is not typical of legitimate user input processing. Once received data is judged to be illegitimate, information that cross-references this fact with the information collected from the computer that originally sent the request could be stored and this stored information could identify that the computer is a suspicious device. For example, the web-server may store information that identifies that the IP address of the requesting computer is not trustworthy and future requests from that IP address could be blocked.

Information that identifies program code locations may include a page name, a page number, a function type, a line number of a set of program code, or other factors. For example, user input received from a browser may cause a web server to access a line 509 of a submit page function when a SQL database request is generated at the web server. This line of this—submit page—function could be used to identify that a database request is illegitimate. Illegitimate functions may also be identified by a mismatching submit page function information or an absence of expected submit page information. As such, methods consistent with the present disclosure may track the flow of program code when collecting contextual information that characterizes how data is received at a web server and how that data are converted into a database request. This contextual information may also include each function or program code page that was accessed when an SQL database request was generated from inputs received from a user device. As such, the generation of the SQL database request could be characterized by a set of program functions performed or program code page locations that were traversed to generate a SQL database request. Methods and apparatus consistent with the present disclosure may prevent an SQL injection attack from stealing data by preventing SQL requests from reaching a database server where they could potentially exploit a vulnerability of SQL program code at a database.

Methods consistent with the present disclosure may be implemented with two different pieces of program code. A first set of program code may be a driver or plugin installed at a web or application server. In certain instances, this web or application server may reside at a hosted website operated by a hosting provider. A second set of program code may perform access control list (ACL) management functions that identify or that manage access rules. These access rules may have been developed in part or entirely by an owner of a program application or a database. The driver or plugin piece of program code may be executed by a processor at a web server. The ACL management function may be executed at an independent time by a processor on the same or on a different machine. The plugin or driver piece may identify whether generated database requests were generated in a manner consistent with entries and rules cross-referenced in a set of ACL management data. The driver or plugin piece of program code may be executed by a processor at a web server. The ACL management function may be executed at an independent time by a processor on the same or different machine. The plugin or driver piece identifies whether generated database requests were generated in a manner consistent with entries and rules cross-referenced in a set of ACL management data. Rules included in such a set of ACL management data, may identify that certain database requests can be sent to a database server and may identify that other database requests should be blocked (prevented) from being sent to the database server. The ACL management data in an access control list may also be cross-referenced with user access privileges. This could allow only administrators to access certain types of data stored at a database server. These access privileges could allow certain individuals to access data at the database, yet not change content in an ACL. As such, external entities that may access data stored at a database may not be allowed to change data stored in an access control list where an administrator could.

In one instance, an application program at a web server may be modified to make an explicit call in the application program to pass program code contextual information and related parameters to processes that evaluate whether a particular database request should be allowed to be sent to a database server or blocked from being sent to the database server. In other instances, other sets of program code could be installed at the web server to identify code contextual information that can be used to identify whether a database request should be allowed or blocked without requiring modification of the application program code. These other instances may use a plugin or driver installed at the web server as previously discussed. This plugin or driver may be inserted between a set of application program code and drivers that are conventionally used with the set of application program code. Such a plugin or driver may be added to a set of program code at a web server. For example, program code could be added to a set of code at a server that is consistent with the PHP scripting language and this program code may be located between code that generates SQL queries and program code that sends those queries to a database server. The plugin or driver code could require that SQL queries be evaluated before they are sent to the database server. In certain instances, a plugin or driver consistent with the present disclosure may intercept program calls based on a page or function associated with a set of program code. Once intercepted, information in the query or associated with the query may be compared to information in an access control list (ACL).

This comparison could compare information associated with known good requests that the ACL may cross-reference with an "allow" action that would cause this good request to be sent to a database server. This comparison could also compare information associated with known bad requests. Bad request information may be cross-referenced with a "deny" action that could prevent the bad request from being sent to the database server. Whenever a particular request is associated with a "deny" function, error messages may be sent to administrators or other actions may be taken to ensure that requests from a particular computer will be rejected before a database request is generated. For particular requests that cannot be cross-referenced as an explicit "allow" or "deny" action, a corresponding response could be configured to "deny," to "allow," or to perform other actions.

Methods and apparatus consistent with the present disclosure may prevent SQL injection attacks from being able to access data stored at a database. As such, these methods and apparatus may be used to prevent hackers from accessing password data, credit card information, banking information, or other sensitive data. Each page provided to a user via a web browser may be a server side file, where each of a set of pages may generate one or more SQL queries. While SQL database queries are discussed, the present disclosure is not limited to SQL database queries and the methods or apparatus discussed in this disclosure may be consistent with any type of data base query known in the art.

FIG. 1 illustrates different computing devices that may communicate with each other when a user device attempts to access data stored at a database. FIG. 1 includes user device 110, cloud or Internet 120, web server 130, and database server 140. Web server 130 includes plugin 135 that performs functions consistent with the present disclosure. A user at user device 110 could login to webserver 130 by sending communications via cloud or internet 120 and plugin 135 at web server 130 may then collect information that could be used to classify whether data received from user device 110 is associated with a legitimate data request or not. Once user input is received at web server 130, program code of plugin 135 at web server 130 could collect information that identifies user device 110 or that identifies a type of browser that generated the request data and possibly additional information about the state of the web application code and/or the web server program and then a database request may be generated from the received user data. When the generated request is identified a being legitimate, web server 130 may send the request to database server 140 and database server may provide data associated with the request to web server 130 such that the retrieved data can be provided to user device 110. In certain instances, a processor at web server 130 may execute instructions that allow the processor to sanity check data received from database server. For example, the processor executing program code of plugin 135 at web server 130 may identify that a particular request returns more data than is typical for a database request.

Table 1 includes sets of data that may be used to identify whether a request for data is legitimate. Table 1 includes a first column of data that identifies a location where an SQL database request query originated, a second column of data that identifies an SQL query function, a third column of data that identifies an operation condition, a fourth column of data that identifies an SQL query filter, and a fifth column of data that identifies an action to perform on generated SQL database queries that match data in table 1. Table 1 may be referred to as an access control list (ACL) that cross-references data associated with SQL requests with actions that should be performed when a new SQL request matches data in a row of table 1. The query origins (e.g. a login PHP page) and/or the origin query functions (e.g. check passwords) illustrated in table 1 are examples of reference information that may be compared to information collected when a database request is generated. The query filters of table 1 include examples of parameters that may be included in a database request. The "single user" indication identified by "user.name" in table 1 are examples of constraints that may limit the scope of a database query. Other exemplary constraints in table 1 include a selection of *.* all users and a selection of user.passwords of all users do not significantly limit the scope of a database query as these constraints could cause information related to many users to be retrieved with a single database query.

After user input has been received at a web server, the web server may generate a database query from that received user input. A processor executing instructions out of a memory may collect information when the database query is generated. The processor may then identify that the collected information matches reference information included in an ACL and may also identify that a parameter in the generated database query matches a constraint in the ACL when identifying an action to take based on the matching information.

TABLE 1

| SQL Query Origin Web Page | SQL Query Origin Function | Operation | SQL Query Filter | Action |
|---|---|---|---|---|
| Login.php | CheckPW | Contains | "Select user.password of a user with single user, e.g. user.name" | Allow |
| Login.php | CheckPW | Contains | "Select *.* of Users" | Deny |
| Login.php | CheckPW | Equals | "Select User.password of all Users" | Deny |

Note that the queries in table 1 are each associated with a Login.php script that may be used to generate an SQL request and each of the query functions in table 1 are associated with checking a user password. Operational conditions in table 1 include "contains" and "equals." The operational condition of "contains" may be used to identify information that may be included in a SQL database request, when that request is checked to see if it is legitimate. This check may compare location information, information that identifies a program code function, and query filtering constraints when filtering illegitimate requests from legitimate requests. This may include checking to see if a request contains or includes certain information or checking to see whether the request is identically equal (matches) all data of a filtering query entry of table 1. As such, the operational condition of "equals" may be used to identify information in an SQL request that exactly matches information included in that SQL filtering query entry.

Note that the SQL query filter information in the first row of table 1 is associated with the selection of a user password of a particular user identified by a user name "user.name" and that the action associated with an SQL request associated with selecting the user password of the particular user should be allowed. This may be due to a judgement that requesting password information regarding a single user is acceptable. A set of SQL query filter information in row 2 of table 1 is associated with a function that requests information relating to all users. Note that the action in this second row indicates that requests for data relating to all users should be denied. A third row in table 1 includes SQL query filter information of select user passwords of all users. The action in the third row of table 1 is deny, this indicates that requests related to all user passwords should be denied. As mentioned above the SQL query filters in table 1 may identify constraints that are matched with parameters of a database query.

Table 1 may include data that acts as a look-up list that cross-references pairs of SQL query related information with a set of rules. Additional rules may allow an administrator with administrative access privileges to access and view an administration page that includes information related to all user accounts. Additional rules may also prevent a user with normal user access privileges from being able to access or view the administration page that includes information related to all of the user accounts. Any SQL query that does not specify request information explicitly may be assumed to be a suspicious query associated with an SQL injection attack. Furthermore, any SQL information that requests more than a threshold amount of information may be judged suspicious and be denied (or blocked). As such, information stored in table 1 or in a similar access control list may identify data that can be accessed according to a set of specific constraints. For example, requests associated with a particular user may be allowed only when those requests attempt to access data that relates to that particular user and not another user.

Figure 2:
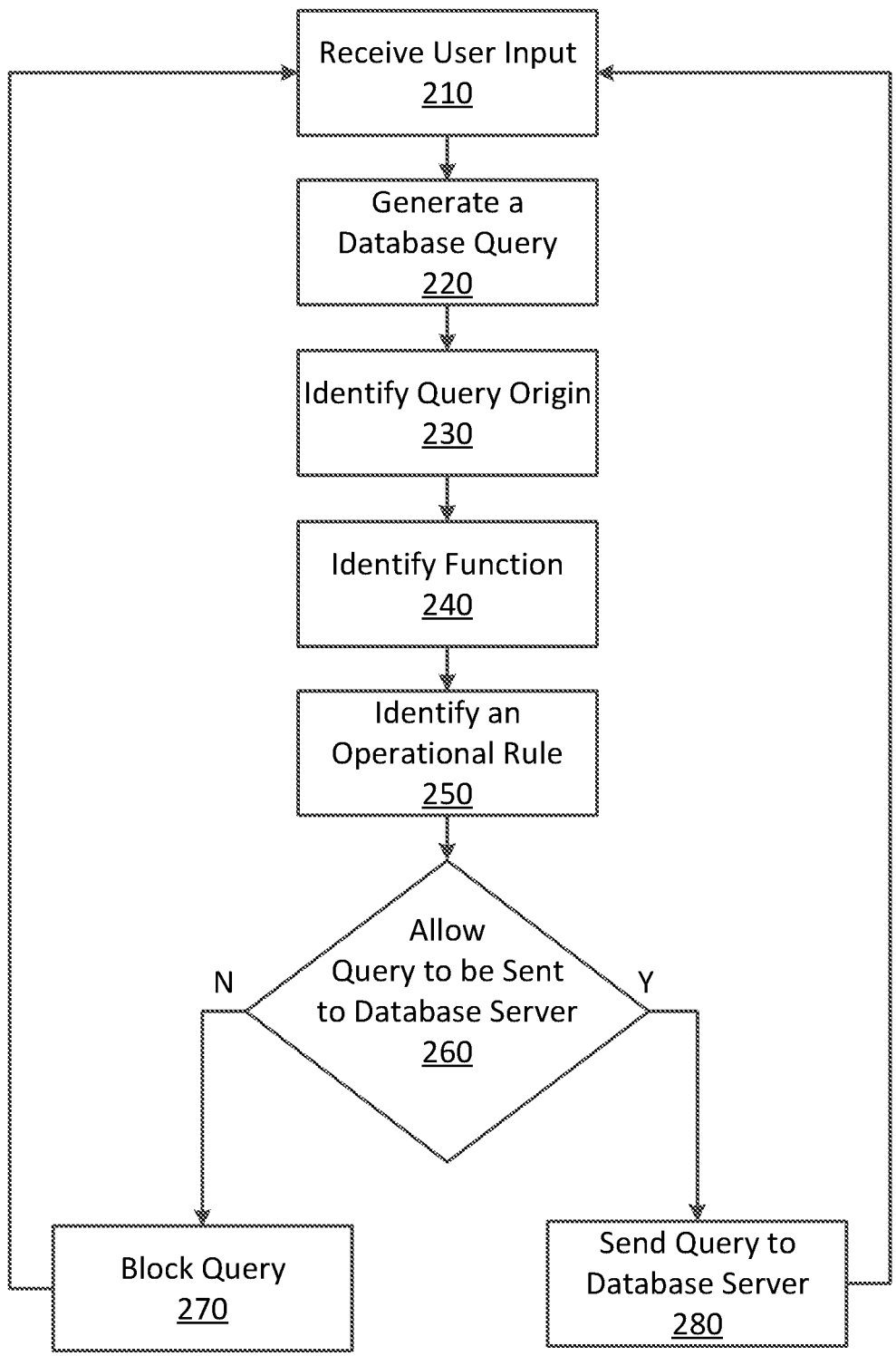
FIG. 2 includes a series of steps that may be performed by a processor executing program code at a web server after user input has been received.

FIG. 2 includes a series of steps that may be performed by a processor executing program code at a web server after user input has been received. Step 210 is a step where user input and a user device identifier (ID) are received, this user input could be a request sent from a user device to access data. For example, the user input could identify that a user wishes to access user information stored at a database. After the web server receives the user input, a processor at the web server could generate a database query in step 220 of FIG. 2. Information may be collected in steps 210 and 220 that is used to evaluate whether the query was generated from program code locations that are associated with non-threatening database access requests based on using functions consistent with legitimate access requests according to an operational rule. From this collected information, an origin of a query could be identified in step 230, a function could be identified in step 240 and so on for all requisite parameters, and an operation rule could be identified in step 250 of FIG. 2. Once the query origin, function and other requisite parameters are identified, information included in the query could be compared to constraints of the operational rule identified in step 250. Data stored in a query table, such as table 1 may be used to cross-reference known good query origin locations with known good functions and with the constraints of the operational rule when the processor at the web server evaluates whether the query should be allowed to be sent to a database server in step 260 of FIG. 2. When determination step 260 identifies that the query should not be sent to the database server, program flow may move to step 270 where the processor may block (prevent) that query from being sent to the database server. When determination step 260 identifies that the query can be allowed to be sent to the database server, program flow may move to step 280 where the processor may allow that query to be sent to the database server. After step 270 or after step 280, program flow may move back to step 210 where additional user input is received. In certain instances, when determination step 260 identifies that the query should be blocked, a communication link with the user device that provided the user input may be disconnected and information that identifies that the user device is a suspicious device may be stored at the web server.

Information relating to a particular database request collected in FIG. 2 may be provided to the database server or a proxy computer when that particular database request is provided to the database server. This could allow the database server or a proxy computer to also interrogate data included in or associated with the generated database request. Information sent to the database server or a proxy computer may include some or all of the information collected by the web server regarding the request. As such, the database server or a proxy computer could be sent client device IP address information, information that identifies the user input, location information related to the request generation, information that identifies a function, or query filter information. A processor at the database server or a proxy computer may then perform additional evaluations on the database request when that processor makes a determination to either allows or block the database request.

Figure 3:
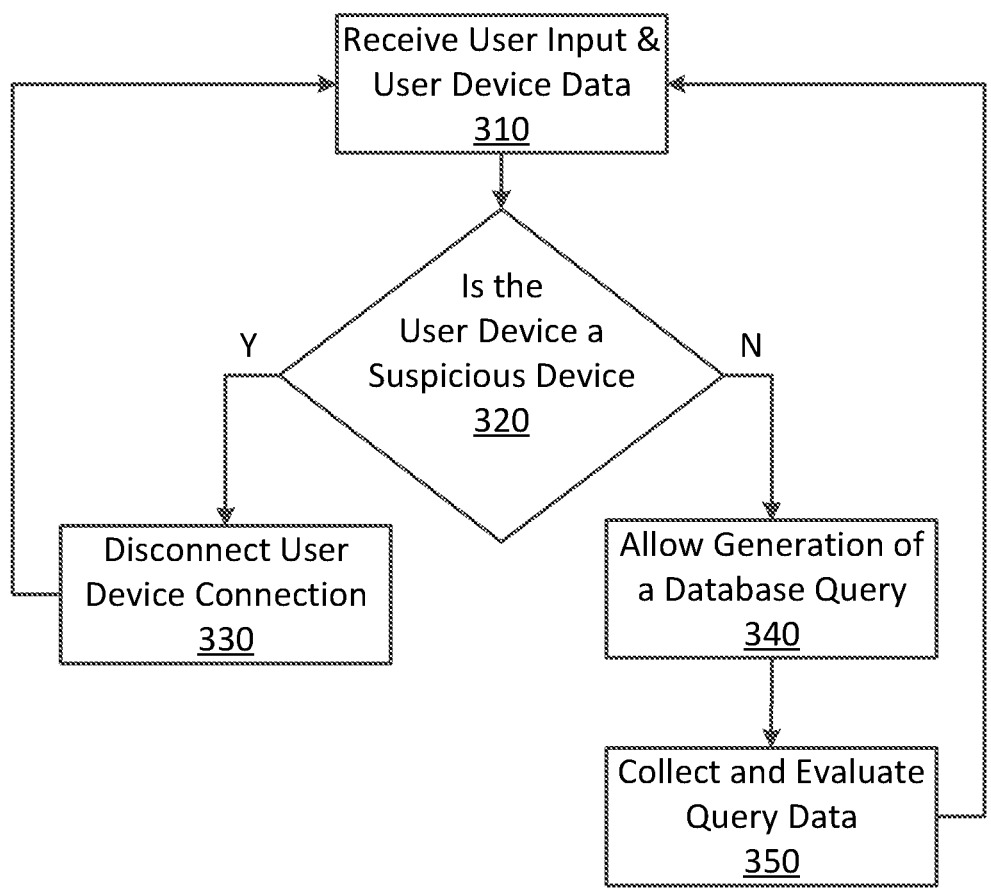
FIG. 3 illustrates a series of steps that may be performed by a processor at a web server when user device information is used to identify whether a user device is a suspicious user device.

FIG. 3 illustrates a series of steps that may be performed by a processor at a web server when user device information is used to identify whether a user device is a suspicious user device. In an instance when user input is received from a suspicious user device, then a communication connection with that user device may be terminated before a database query is generated. As such, methods consistent with the present disclosure may prevent SQL queries from being generated based on information received from suspicious user devices.

In step 310 of FIG. 3, user input and user device information may be received. The user device information received may be or may include an IP address of the user device, may identify a web browser type, or may identify a time zone or location of the user device that provided the user input. The information received in step 310 could be used to identify whether the user device is a suspicious device by storing data that may identify suspicious device in a memory. For example, an IP address of a computer that previously sent data that caused a generated query to be blocked may be used to identify that the same computer is attempting to access data at the database again. A stored IP address of a suspicious computer that matches an IP address of the user device of a new request may cause determination step 320 to identify that the user device is a suspicious device and program flow may move to step 330 where a communication connection with the user device is disconnected. After step 330 program flow may move back to step 310 of FIG. 3.

When determination step 320 identifies that the user device is not a suspicious device, program flow may move to step 340 where a database query is allowed to be generated. Next, in step 350 of FIG. 3, program flow may move to step 350 where data associated with a generated database query is collected and evaluated. Step 350 of FIG. 3 may perform steps 230 through 280 of FIG. 2. After step 350, program flow may move back to step 310 where additional user input data is received.

Figure 4:
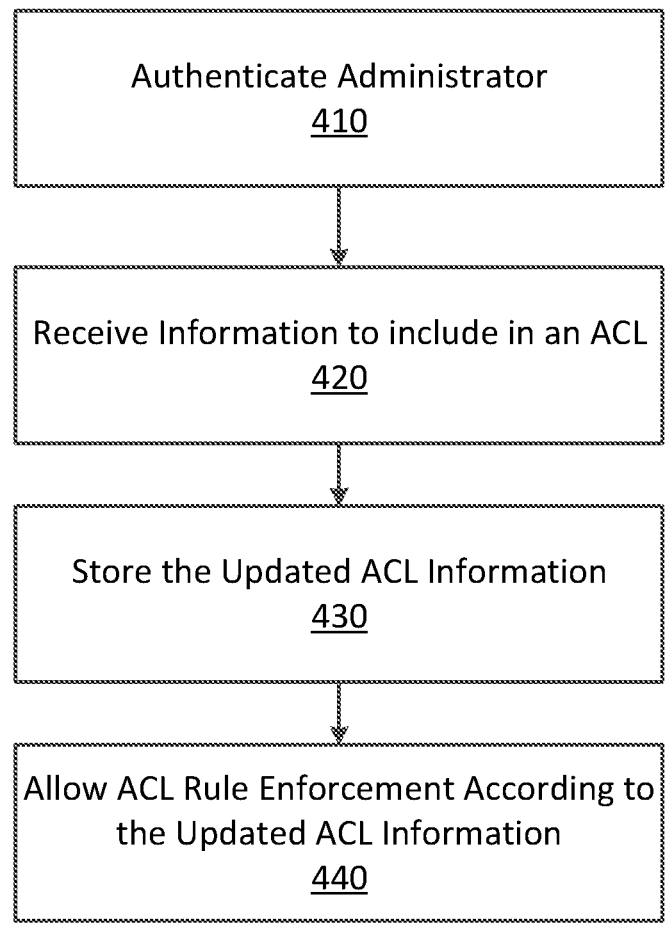
FIG. 4 illustrates a set of steps consistent with a set of access control list (ACL) management software that may be used to identify when a database request should be allowed or denied.

FIG. 4 illustrates a set of steps consistent with a set of access control list (ACL) management software that may be used to identify when a database request should be allowed or denied. FIG. 4 begins with step 410 where an administrator is authenticated. Step 410 may receive user login information, such as a username and a password used to authenticate the administrator. In certain instances, the authentication of the administrator may require that the administrator login using a specific computing device. For example, identifying that the administrator is accessing a web server via terminal in a secure location or is accessing the web server from a computer with an IP address of an authorized device may be performed in step 410 of FIG. 4. As such, administrators may only be allowed to update an access control list (ACL) by using certain specific computing devices. This would prevent unauthorized individuals who have stolen the username and password of an administrator from accessing and updating an ACL at a web server. Computing devices may also be authenticated using a certificate or other data stored at a computer.

After step 410, information to include in an updated ACL may be received in step 420. The information received in step 420 may include information similar to the entries in table 1. As such, this information may identify an origin of an SQL query, a function associated with the SQL query, an operational condition, filter parameters, and an action (e.g. allow or deny). Next in step 430, the updated ACL information may be stored and enforcement of a new ACL rules may be allowed in step 440 according to the updated ACL information.

Figure 5:
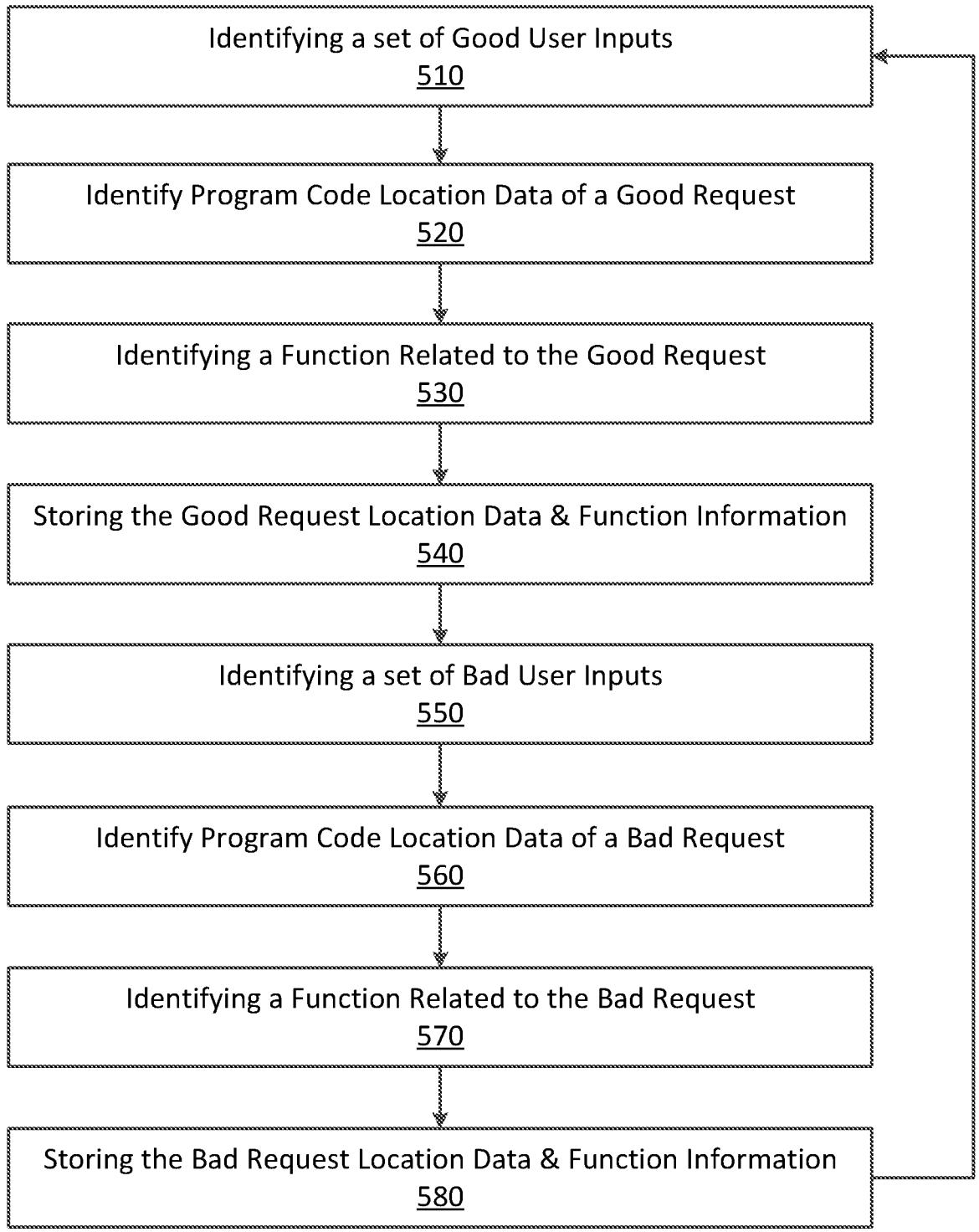
FIG. 5 includes a series of steps that may allow methods and apparatus consistent with the present disclosure to acquire program code contextual information that may be used to identify whether a database request should be serviced or not.

FIG. 5 includes a series of steps that may allow methods and apparatus consistent with the present disclosure to acquire program code contextual information that may be used to identify whether a database request should be serviced or not. FIG. 5 begins with a first step where a set of good user inputs are identified. This step may include one or more pieces of user data that is used to generate a database query. Next, in step 520 program code locations associated with a good request could be identified. For example, the user inputs received in step 510 may have caused program code to be executed at a web server at a particular code page and line of the set of program code and step 530 may identify a function associated with the retrieving information relating to a user or employee. For example, a particular query may be associated with a page of data that generates queries for receiving salary information and the function could be related to retrieving a salary of a specified employee. Next, the location data and identified function data may be stored in step 540 of FIG. 5. The information stored in step 540 may identify the salary page and the fact that a function performed is associated with retrieving employee salary information. The information stored is step 540 may also include a query function, similar to the query filter information illustrated in table 1 that is associated with a good request. This query function could identify that the query is related to retrieving a particular employee's salary using an employee name or other identifier as part of an "SQL SELECT" statement that retrieves data from a database. As such, information in table 1 could be updated to identify that a request for salary information generated from the salary page that is limited to the salary of a single particular employee should be allowed.

After step 540, step 550 of FIG. 5 may identify a bad set of user inputs, step 560 may identify a program code location data associated with a bad request, and step 570 may identify a function that should be associated with the bad database request. This bad request could be associated with query filter information related to retrieving salary information for all employees. Next, in step 580 of FIG. 5, information could be stored that identifies the location data, the function data, and query filter information that should be associated with a deny action. Here again, this information may be stored in table 1. This information could also be classified as including reference information that can be compared to location or function data collected during the generation of a database request and the query filter information that could identify constraints used to identify whether a database request should be allowed to be sent to a database server or whether a database request should be blocked.

The steps illustrated in FIG. 5 could be used by a program that receives user inputs that are judged to be good or bad when a machine learning function is implemented. A plurality of good and bad sets of user inputs could be defined by an administrator after which code paths traversed, functions performed, and filtering operations could be identified, where good user inputs result in collecting data that are associated with an allow action. Furthermore, bad user inputs could result in collecting data that should be associated with a deny function. In certain instances, a specific set of location and function information may be associated with both an "allow" and a "deny" action, where the query filter information is used to identify whether a particular request should be allowed or denied.

Figure 6:
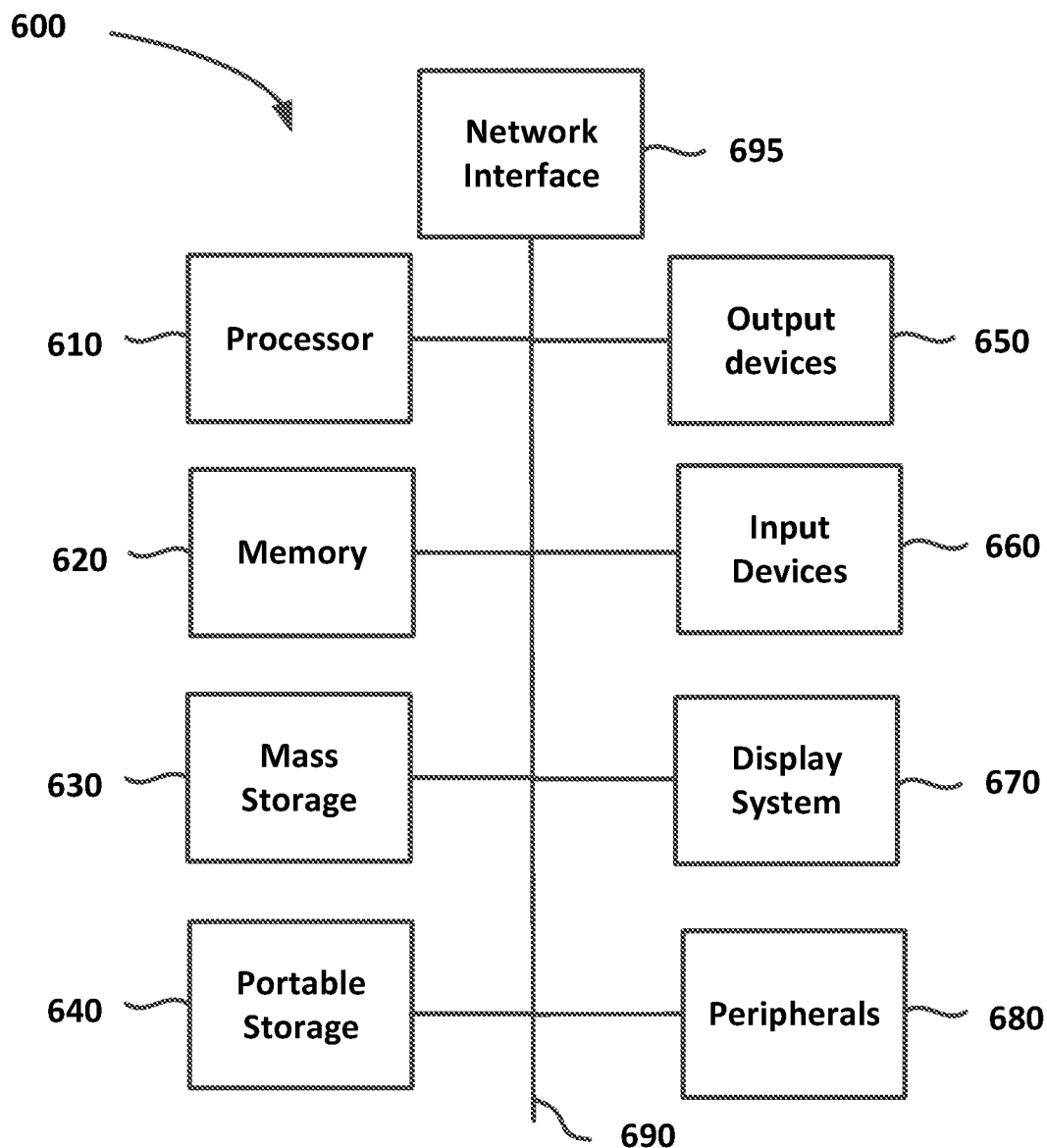
FIG. 6 illustrates a computing system that may be used to implement an embodiment of the present invention.

FIG. 6 illustrates a computing system that may be used to implement an embodiment of the present invention. The computing system 600 of FIG. 6 includes one or more processors 610 and main memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, peripheral devices 680, and network interface 695.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 620.

Portable storage device 640 operates in conjunction with a portable non-volatile storage medium, such as a FLASH memory, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD), a plasma display, an organic light-emitting diode (OLED) display, an electronic ink display, a projector-based display, a holographic display, or another suitable display device. Display system 670 receives textual and graphical information, and processes the information for output to the display device. The display system 670 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 680 may include any type of computer support device to add additional functionality to the computer system. For example, peripheral device(s) 680 may include a modem or a router.

Network interface 695 may include any form of computer interface of a computer, whether that be a wired network or a wireless interface. As such, network interface 695 may be an Ethernet network interface, a BlueTooth™ wireless interface, an 802.11 interface, or a cellular phone interface.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 600 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for identifying data stored at database servers, the method comprising:
    collecting a set of inputs over a communication network from a computing device, wherein the set of inputs is collected in association with a set of credentials sent by the computing device;
    authenticating the computing device as a part of a predetermined set of computing devices allowed to access the database server in accordance with a set of rules based on the set of credentials;
    generating a database query to a database server based on the set of inputs;
    identifying one ore more parameters including at least one of code location data of an origin of the database query before the database query is sent to the database server;
    applying, in response to the identification of the at least one code location data, the set of rules to the authenticated computing device for access to the database server, wherein applying the set of rules includes cross-referencing the identified parameters of the origin of the database query with one or more query origin locations of the set of rules, the identifying that the set of inputs corresponds to known denied queries when the set of inputs corresponds to data associated with a deny action that prevents the database query from being sent to the database server based on the cross-referenced parameters; and
    blocking the database query from being sent to the database server based on the deny action identified by the application of the set of rules.

2. The method of claim 1, further comprising receiving a set of access control information associated with the database request, the set of access control information comprising the set of rules.

3. The method of claim 2, further comprising updating the set of access control information that includes information for a new rule, and enforcing the new rule by allowing the database query to be generated in accordance with the new rule.

4. The method of claim 1, further comprising identifying whether the set of inputs corresponds to known allowed queris or the known denied queries based on execution of a set of program code at a program code page.

5. The method of claim 1, wherein the set of rules are included in an access control list identifying that a first set of database queries is permitted to be processed by the database server and that a second set of database queries is prevented from being processed by the database server.

6. The method of claim 1, wherein the collected set of inputs includes collected information regarding the computing device.

7. The method of claim 6, further comprising:
    storing the collected information regarding the computing device in a memory with information that identifies that the computing device is a suspicious device;
    receiving a second set of inputs; and
    identifying that the suspicious device provided the second set of inputs.

8. The method of claim 7, further comprising preventing a second database request from being generated from the second set of inputs based on the identification that the suspicious device provided the second set of inputs.

9. A non-transitory computer-readable storage medium having embodied thereon a program for implementing a method for identifying data stored at database servers, the method comprising:
    collecting a set of inputs over a communication network from a computing device, wherein the set of inputs is collected in association with a set of credentials sent by the computing device;
    authenticating the computing device as a part of a predetermined set of computing devices allowed to access the database server in accordance with a set of rules based on the set of credentials;
    generating a database query to a database server based on the set of inputs;
    identifying one or more parameters including at least one of code location data of an origin of the database query before the database query is sent to the database server;
    applying, in response to the identifiction of the at least one code location data, the set of rules to the authenticated computing device for access to the database server, wherein applying the set of rules includes cross-referencing the identified parameters of the origin of the database query with one or more query origin locations of the set of rules, and identifying that the set of inputs corresponds to known denied queries when the set of inputs corresponds to data associated with a deny action that prevents the database query from being sent to the database server based on the cross-referenced parameters; and blocking the database query from being sent to the database server based on the deny action identified by the application of the set of rules.

10. The non-transitory computer-readable storage medium of claim 9, further comprising instructions executable to receive a set of access control information associated with the database request, the set of access control information comprising the set of rules.

11. The non-transitory computer-readable storage medium of claim 10, further comprising instructions executable to update the set of access control information that includes information for a new rule, and enforcing the new rule by allowing the database query to be generated in accordance with the new rule.

12. The non-transitory computer-readable storage medium of claim 9, further comprising instructions executable to identify whether the set of inputs corresponds to known allowed queries or the known denied queries based on execution of a set of program code at a program code page.

13. The non-transitory computer-readable storage medium of claim 9, wherein the set of rules are included in an access control list identifying that a first set of database queries is permitted to be processed by the database server and that a second set of database queries is prevented from being processed by the database server.

14. The non-transitory computer-readable storage medium of claim 9, wherein the collected set of inputs includes collected information regarding the computing device.

15. The non-transitory computer-readable storage medium of claim 14, further comprising instructions executable to:

store the collected information regarding the computing device in a memory with information that identifies that the computing device is a suspicious device;

receive a second set of inputs; and identify that the suspicious device provided the second set of inputs.

16. The non-transitory computer-readable storage medium of claim 15, further comprising instructions executable to prevent a second database request from being generated from the second set of inputs based on the identification that the suspicious device provided the second set of inputs.

17. A system for identifying data stored at database servers, the system comprising:

a communication interface that communicates over a communication network with a computing device, wherein the communication interface collects a set of inputs in association with a set of credentials sent by the computing device; and a processor that executes instructions stored in memory, wherein the processor executes the instructions to:

authenticate the computing device as a part of a predetermined set of computing devices allowed to access the database server in accordance with a set of rules based on the set of credentials;

generate a database query to a database server based on the set of inputs;

identify one or more parameters including at least one of code location data of an origin of the database query before the database query is sent to the database server;

apply, in response to the identifiction of the at least one code location data, the set of rules to the authenticated computing device for access to the database, wherein applying the set of rules includes cross-referencing the identified parameters of the origin of the database query with one or more query origin locations of the set of rules, and identifying that the set of inputs corresponds to known denied queries when the set of inputs corresponds to data associated with a deny action that prevents the database query from being sent to the database server based on the cross-referenced parameters; and block the database query from being sent to the database server based on the deny actions identified by the application of the set of rules.

* * * * *